S. N. LENNON.
Fence-Post.
No. 202,179.    Patented April 9, 1878.
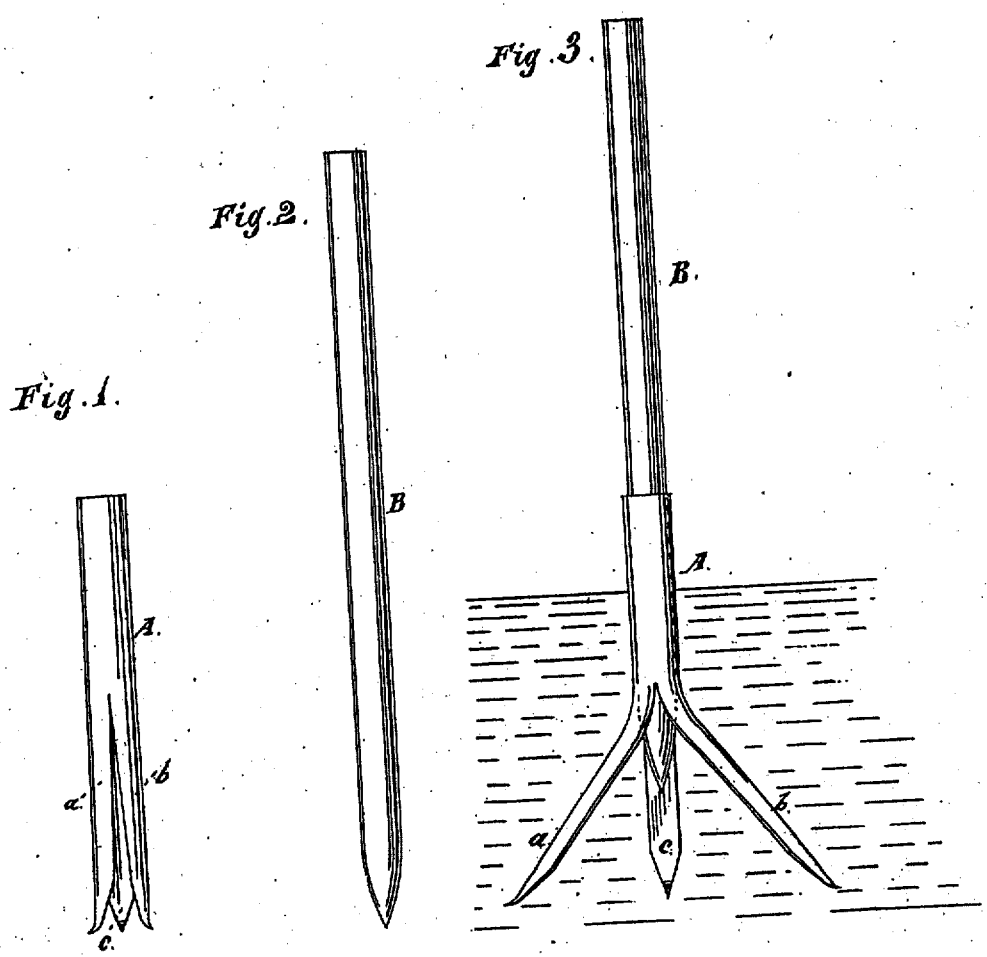

UNITED STATES PATENT OFFICE.

SAYRES N. LENNON, OF CHICAGO, ILLINOIS.

IMPROVEMENT IN FENCE-POSTS.

Specification forming part of Letters Patent No. 202,179, dated April 9, 1878; application filed November 17, 1876.

*To all whom it may concern:*

Be it known that I, SAYRES N. LENNON, of Chicago, in the county of Cook and State of Illinois, have invented a new and useful Improvement in Fence-Posts; and I hereby declare the following to be a full, clear, and exact description thereof, reference being had to the accompanying drawings, of which—

Figure 1 is a side view of the fence-post socket or support before being driven into the ground; Fig. 2, a side view of the center post before being driven through the socket or sleeve of the support, and Fig. 3 a side view of the post complete when driven into the ground.

The object of my invention is to overcome difficulties in the manufacture of the post for which Letters Patent of the United States No. 184,635 were granted to me November 21, 1876, and also to make a stronger post with less metal.

To this end my invention consists in employing a fence-post socket or support with the self-spreading legs or roots described in my former patent, into or through which socket or support may be driven either a wooden or metal center post, which thus also penetrates the ground, forming a central leg or support.

In the manufacture of the socket-tube the metal may be so rolled as to place more metal at the parts where greater strength and weight are necessary, and less at the other parts. This cannot be so easily done where a single plate of metal is used for the whole post.

In the drawings, A represents the socket or support, composed of metal and made of tubular form, with the legs or roots $a\ b\ c$ formed from the body of the same, as described in my patent hereinbefore referred to.

In Fig. 3 the support A is shown driven into the ground, (the roots or legs having been spread by the driving,) and the post or shaft B driven through the support, and also into the ground.

I do not claim the legs or roots of the post-support with the points turned outward, whereby they spread themselves when driven, having claimed the same in my patent hereinbefore cited.

I am aware that post-supports have been made to rest upon the ground, and also to be anchored to the ground; also, with one root or leg to be driven or set into the ground.

What I claim as new, and desire to secure by Letters Patent, is—

1. The metallic fence-post support A, having spreading legs or roots $a\ b\ c$, in combination with a wood or metal post, B, driven through or into the same, substantially as described.

2. A fence-post formed of the metallic support A, having spreading legs or roots $a\ b\ c$, and the center post of metal or wood B, driven into or through the same, substantially as shown in Fig. 3.

SAYRES N. LENNON.

Witnesses:
AARON K. STILES,
EZRA A. HELM.